Jan. 6, 1970  JOON S. MOON ET AL  3,488,159

JET-PULSED LIQUID-LIQUID EXTRACTION COLUMN

Filed May 6, 1969

INVENTORS
JOON S. MOON
THEODORE VERMEULEN
BY
Roland A. Anderson
ATTORNEY

United States Patent Office 3,488,159
Patented Jan. 6, 1970

3,488,159
JET-PULSED LIQUID-LIQUID EXTRACTION COLUMN
Joon S. Moon, Mexico City, Mexico, and Theodore Vermeulen, Berkeley, Calif., assignors to the United States of America as represented by the United States Atomic Energy Commission
Filed May 6, 1969, Ser. No. 822,216
Int. Cl. B01d 59/22, 11/04
U.S. Cl. 23—270.5                                    4 Claims

ABSTRACT OF THE DISCLOSURE

A liquid-liquid extraction column which does not require packing and which operates with an extremely high flow rate. A plurality of distributors predisposed along the length of the column, each being provided with a series of small holes. The distributors are jointly connected to a single pulsing mechanism external to the column via a single manifold connected to all the distributors, or are separately connected to separate pulsing units, the pulsing mechanism in either case functioning to cycle liquid through the many small holes in the distributors. The use of a pulse assembly having many small distributed outlets eliminates the need for internal packing such as Raschig rings or saddles, and provides greater flow and contact for the two liquid phases.

Background of the invention

The invention described herein was made in the course of, or under, Contract No. W-7405-ENG-48, with the United States Atomic Energy Commission.

The present invention relates to solvent extraction columns and more particularly to an improved pulsed-type extraction column.

A pulsed column is normally a substantially vertical column in which two fluids or phases are moved countercurrently to each other. One fluid enters near the bottom and is withdrawn at the top while the other fluid enters near the top and is withdrawn at the bottom. Between the inlets the fluids are thoroughly mixed in order that one fluid may extract a solute from the other. The lighter fluid enters at the lower inlet while the heavier fluid enters near the top. By control of operating conditions, one of the phases is made continuous and the other is dispersed.

Most extraction columns have means for enhancing the mixing. This may take the form of packing such as Raschig rings, or of fixed plates disposed horizontally one above the other within the column and perforated to permit passage of the liquids in opposite directions.

In a pulsed column, a pulsed motion of the liquids is superimposed on the gravity flow. It is widely recognized that in countercurrent extraction columns and especially in pulsed columns, the effective mass transfer rate is lowered by longitudinal dispersion (or axial mixing) in eitheir phase. Longitudinal dispersion is caused by flow eddies (which result from the normal flow and from any incremental flow due to pulsing) in open spaces of the column, and also by nonuniformity in the velocities of the individual fluid filaments.

The packed column, commonly utilized in the art, is a simple and economical type of equipment for performing a variety of mass-transfer operations in the chemical industry. Packed columns of the prior known type used in liquid-liquid extraction may be divided into two basic categories, according to the energy source used to obtain contact of the two immiscible phases; this energy comes in the most commonly employed type from the force of gravity acting upon the density difference between the two liquids; in the other, extra energy is supplied by pulsation of one of the entering or leaving streams. The energy obtained from density difference is usually not optimum for providing an effective interphase contact. With additional mechanical energy supplied to move the liquid up and down, the packing becomes a sort of stirrer, with the advantage that agitation occurs uniformly over the entire volume, but with the disadvantage that axial dispersion also increases. The net effect is more favorable than unfavorable, and the column efficiency may be improved up to a factor of three by applying proper pulsation.

Pulsing of liquid extraction columns is widely practiced in the art but has heretofore been done through a large single outlet with the result that internal packing or perforated plates is required in the column. Also, much prior effect has been directed to reducing longitudinal dispersion in pulsed-packed columns as well as unpulsed columns.

Summary of the invention

The present invention is applicable to any liquid extraction column wherein it is possible to increase efficiency by pulsing; i.e., by cyclically withdrawing and reinjecting a portion of the liquid in the column. The present invention provides apparatus which makes it possible to pulse the column in a much more direct and efficient manner, while eliminating the need for any packing such as Raschig rings or sieve plates, which have heretofore been needed to effect greater contact between the two liquid phases. The removal of the internal packing increases the permissible flow rates in an extraction column of a given size. In addition the apparatus of the present invention substantially reduces the prior problem of longitudinal dispersion.

Accordingly, it is an object of this invention to provide a more efficient liquid-liquid extraction column.

It is a further object of the invention to provide an apparatus to increase the flow capacity of existing solvent extraction columns.

Another object of the invention is to provide a liquid-liquid extraction column which does not require packing and which utilizes internal pulsing of the contents of the column by the withdrawal and reinjection of fluid at various spaced locations along the column.

Other objects of the invention will become readily apparent from the following description and accompanying drawings:

Figure 1:
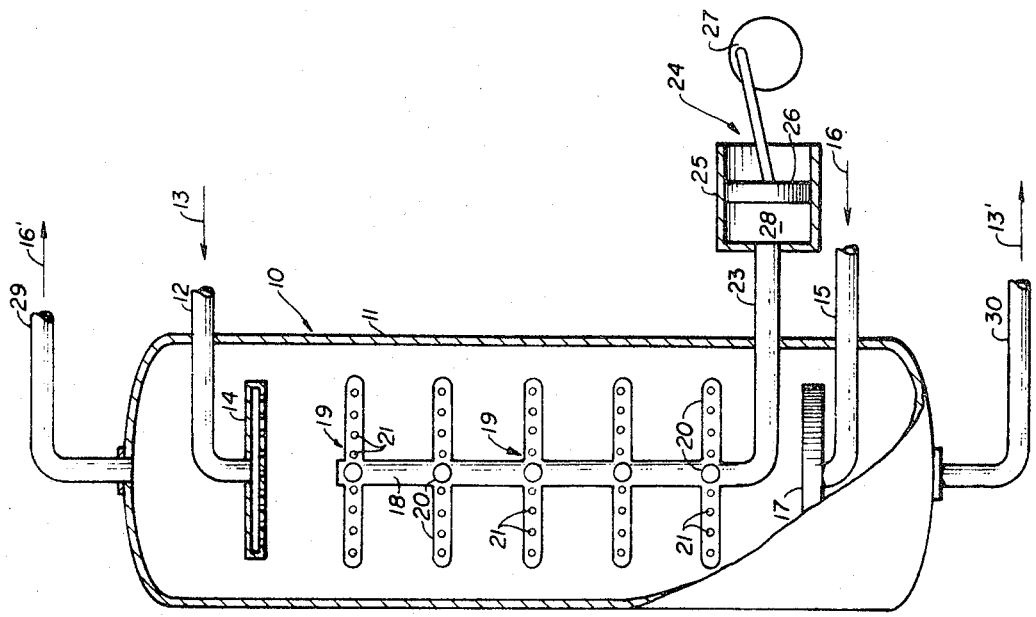
FIGURE 1 is a view partially in cross section illustrating an embodiment of the invention.

Referring now to the drawings, there is shown in the FIGURE 1 embodiment an extraction column generally indicated at 10 contained by a vessel 11, of the typical design used in liquid extraction, having a long cylindrical construction with elliptical end closures and mounted in a vertical position. An inlet feed line 12 for introducing the heavy liquid flow indicated at 13 extends into the upper portion of vessel 11 and terminates in a perforated distributor outlet or nozzle 14 located on the longitudinal axis of vessel 11. A second inlet feed line 15 introduces the light liquid flow indicated at 16 into the lower portion or base of the vessel 11 through a second similarly located perforated distributor outlet or nozzle 17. Both distributors 14 and 17 distribute the respective liquids 13 and 16 evenly throughout the cross-section of vessel 11. The liquids 13 and 16 are immiscible in each other, as is understood within the art, the column 10 being typically employed to transfer a substance from one liquid to the other.

In the center of vessel 11, intermediate distributors 14 and 17, a vertical manifold 18 is disposed, the manifold 18 having a plurality of distribution members or radiating arm assemblies 19 positioned in spaced relationship therealong. Each of the radiating arm assemblies, in this embodiment, consist of four radially extending arms 20 interconnected at the inner end thereof to manifold 18 for receiving fluid therefrom. Each of the radially extending arms 20 contain a plurality of small diameter holes or apertures 21 pointing horizontally and distributed along the length on two sides thereof. Connected to the base of manifold 18 is a line or conduit 23 which extends outwardly through vessel 11 and is operatively connected to a pulsing unit generally indicated at 24, which, for example, comprises a cylinder 25 having a rapidly reciprocating piston 26 therein defining a chamber 27 and driven by a prime mover 28.

In operation of the FIGURE 1 embodiment, with the liquids 13 and 16 dispersed via distributors 14 and 17 into vessel 11, pulsing unit 24 alternately draws the liquid in vessel 11 inwardly and outwardly through the plurality of apertures 21 due to the movement of piston 26 in chamber 27, thereby maintaining the dispersion of one liquid within the other in the form of droplets as is desired in solvent extraction processes. The lighter liquid phase 16', after passing through vessel 11, leaves through pipe or line 29 at the top of vessel 11. Conversely the heavier liquid phase 13' leaves the vessel 11 through a pipe or line 30 at the base of vessel 11.

Pulsation, due to the manifold 18, radial arms 19 and pulsing unit 24, promotes and maintains finer dispersion of the droplet phase and increases the internal circulation of the droplets. The material to be extracted is thus more easily transferred from the droplet phase to the continuous phase, or vice versa.

The absence of internal packing such as rings, saddles or sieve plates provides a greater cross-sectional area for two phase concurrent fluid flow which greatly increases the capacity of a solvent extraction column embodying the present invention.

Figure 2:
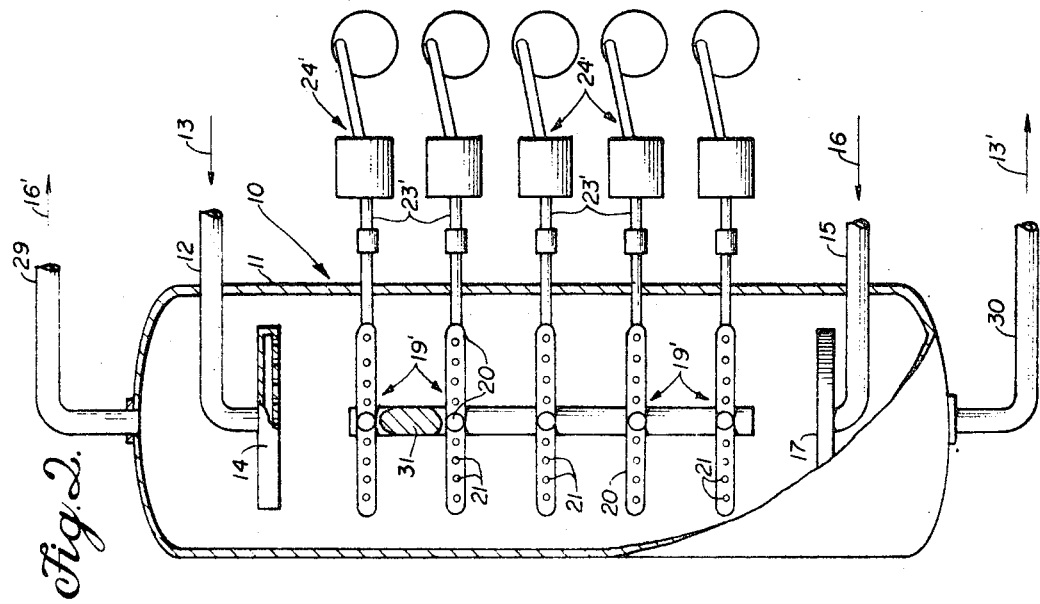
FIGURE 2 is a partial cross-sectional view illustrating another embodiment of the invention.

The FIGURE 2 embodiment of the invention is generally similar to the FIGURE 1 embodiment except in the arrangement of the pulsing mechanism and the elimination of the common manifold. Thus like elements will be given corresponding reference numerals. The column 10' consists of a vessel 11, perforated distributors 14 and 17 for liquids 13 and 16 supplied thereto through pipes or lines 12 and 15, respectively, and outlets 29 and 30 for the discharge of liquid phases 16' and 13' as previously described. Distribution members or radiating arm assemblies 19' are similar in construction to those of FIGURE 1 in that they each include four radially extending arms 20 provided with a plurality of holes or apertures 21, the difference being that the manifold 18 of FIGURE 1 has been replaced with a support member 31 which, as illustrated, may be solid except at the points of interconnection with arm assemblies 19', these portions of member 31 being hollow to provide, in effect, a common manifold for each of the radial arms 20 to which conduit or line 23' is connected and through which liquid to and from pulsing unit 24' is directed. Each of the arm assemblies 19' is connected to a separate pulsing unit 24', whereby the pulsing of the liquid can be varied, if desired, at different points along the length of vessel 11. It is readily seen that support member 31 may be solid throughout the entire length thereof with the conduits or lines 23' connected directly to the radial arms 20 of each arm assembly 19' or through various types of manifolding arrangements. Also, with the individual arm assemblies 19' being connected through separate lines with a pulsating unit, it is within the scope of this invention to utilize a single pulsing mechanism with separate pulsing sections each connected to a separate arm assembly or a single pulsing mechanism connected through appropriate valving, etc. to each of the arm assemblies. In any case, the FIG. 2 embodiment provides pulsing of the liquids in vessel 11 at different points without intermixing the fluids at these various points and thus not disturbing the extraction process, while increasing the flow rate and decreasing longitudinal dispersion in the column, due primarily to the elimination of packing therein.

It is thus seen that the present invention provides an improved pulsed extraction column, the pulsation promoting and maintaining finer dispersion of the droplet phase and increasing the internal circulation of the droplets, whereby material to be extracted is more easily transferred from the droplet phase to the continuous phase or vice versa. The absence of internal packing such as rings, saddles or sieve plates provides a greater cross-sectional area for two phase concurrent fluid flow which greatly increases the capacity of a solvent extraction column.

Although particular embodiments of the invention have been illustrated and described, modifications will become apparent to those skilled in the art, and it is intended to cover in the appended claims all such modifications as come within the spirit and scope of the invention.

What is claimed is:

1. A pulsed apparatus for intimately contacting and separating substantially immiscible liquids of different specific gravities comprising: a substantially vertical hollow column, an inlet for heavy liquid and an outlet for light liquid at one end portion of the column, an inlet for light liquid and an outlet for heavy liquid at the other end portion of the column, a plurality of hollow apertured members mounted in vertically spaced relation within the column, said apertured members each comprising a radiating arm assembly including a plurality of radially extending hollow arm-like members, each arm-like member being provided with a plurality of apertures having an axis substantially perpendicular to the longitudinal axis of said hollow column, and means communicating with the hollow of each of said members for cyclically withdrawing liquid from said column through said apertured members into said hollow and for reinjecting said withdrawing liquid in said hollow back through said apertured members into said column.

2. The apparatus defined in claim 1, wherein said means for withdrawing and reinjecting liquid includes a substantially centrally located manifold means interconnecting and communicating with the hollow of each of said plurality of radiating arm assemblies, and a reciprocating type means communicating with said manifold means, whereby reciprocating motion of said reciprocating means causes the withdrawing and reinjecting of liquid.

3. The apparatus defined in claim 1, wherein said means for withdrawing and reinjecting liquid includes a plurality of reciprocating units individually communicating with individual hollow apertured members.

4. The apparatus defined in claim 3, additionally including a central support means interconnected between each of said apertured members.

References Cited

UNITED STATES PATENTS

| | | | |
|---|---|---|---|
| 1,509,686 | 9/1924 | Morterud | 23—267 X |
| 2,011,186 | 8/1935 | Van Dijck | 23—267 X |
| 2,629,654 | 2/1953 | Olney | 23—267 X |
| 2,729,550 | 1/1956 | Maycock | 23—267 X |
| 2,765,913 | 10/1956 | Weiss | 23—310 X |
| 2,927,006 | 3/1960 | Brooks | 23—267 X |
| 2,985,637 | 5/1961 | Anselm | 23—267 X |
| 3,174,832 | 3/1965 | Bohrer | 23—273 |
| 3,226,092 | 12/1965 | Graham | 23—270.5 X |
| 3,330,535 | 7/1967 | Stengel | 259—4 |
| 3,390,402 | 6/1968 | Goerg | 23—270 |

OTHER REFERENCES

Sege et al., Chemical Engineering Progress, August 1954, vol. 50, No. 8, pp. 396 thru 402.

Smoot et al., I. & E. C. Fundamentals, vol. 1, No. 2, May 1962, pp. 93 and 94.

NORMAN YUDKOFF, Primary Examiner

S. J. EMERY, Assistant Examiner

U.S. Cl. X.R.

23—271, 310; 196—14.52; 210—19; 259—4